United States Patent [19]

Schroeder et al.

[11] 4,435,184

[45] Mar. 6, 1984

[54] METHOD OF RECOVERING BORIC ACID FROM WASTE-WATER CONCENTRATES OF NUCLEAR PLANTS

[75] Inventors: Heinrich J. Schroeder, Biblis; Rainer Ambros, Biblis-Wattenheim; Gottfried Paffrath, Hohen Sülzen; Norbert Brenner, Bürstadt, all of Fed. Rep. of Germany

[73] Assignee: Rheinisch-Westfälisches Elektrizitätswerk AG, Essen, Fed. Rep. of Germany

[21] Appl. No.: 259,094

[22] Filed: Apr. 30, 1981

Related U.S. Application Data

[63] Continuation-in-part of Ser. No. 215,151, Dec. 11, 1980, abandoned.

[30] Foreign Application Priority Data

Dec. 15, 1979 [DE] Fed. Rep. of Germany ....... 2950601

[51] Int. Cl.³ .................... B01D 9/02; C01B 35/10
[52] U.S. Cl. .................................... 23/300; 252/631; 376/328; 376/904; 423/283
[58] Field of Search ............... 252/631; 376/328, 904; 423/283; 23/300

[56] References Cited

U.S. PATENT DOCUMENTS

| | | | |
|---|---|---|---|
| 2,089,406 | 8/1937 | Newman | 423/283 |
| 2,113,248 | 4/1938 | Berg | 423/283 |
| 3,378,450 | 4/1968 | Grämer et al. | 376/328 |
| 3,380,889 | 4/1968 | Loose | 376/328 X |
| 4,287,163 | 9/1981 | Garrett et al. | 423/283 |

FOREIGN PATENT DOCUMENTS

54-158599 12/1979 Japan .................. 252/631

OTHER PUBLICATIONS

Lewis, College Chemistry, Barnes and Noble Books, New York, 9th Ed., 1971, pp. 22 and 23.
The Condensed Chemical Dictionary, 9th Ed., 1977, Van Nostrand Reinhold Co., New York, p. 121.

*Primary Examiner*—Leland A. Sebastian
*Attorney, Agent, or Firm*—Karl F. Ross; Herbert Dubno

[57] ABSTRACT

A waste-water concentrate containing boric acid together with chemical residues and radionuclides, especially from a nuclear power plant, is treated to recovering boric acid which can be recycled to the plant. According to the invention, the practically neutral solution is acidified with an acid selected from the group which consists of sulfuric acid, hydrochloric acid, nitric acid and acetic acid to precipitate the boric acid which is separated from the concentrate and subjected to at least one recrystallization step. The boric acid thus obtained is of comparatively high purity.

3 Claims, 1 Drawing Figure

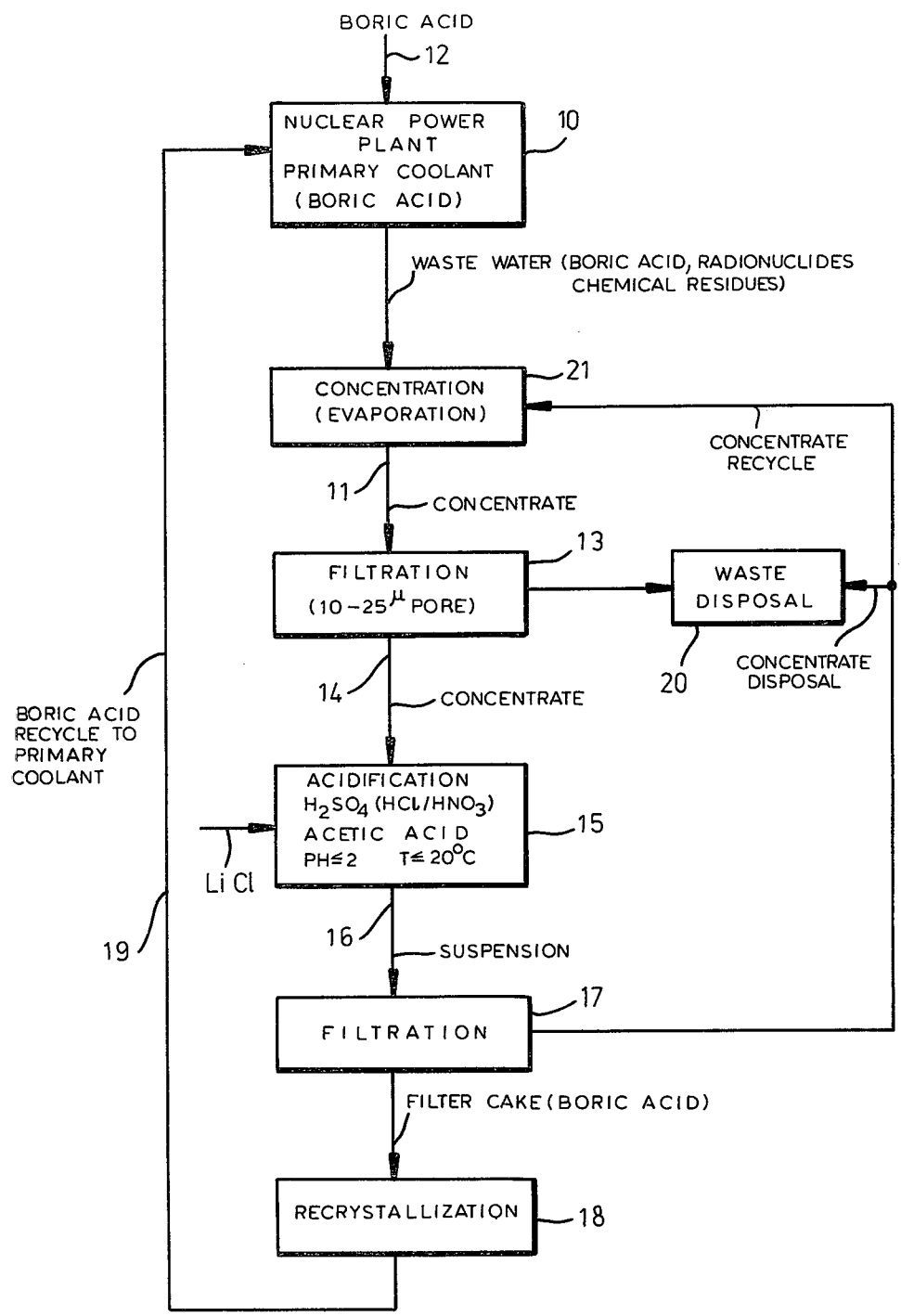

METHOD OF RECOVERING BORIC ACID FROM WASTE-WATER CONCENTRATES OF NUCLEAR PLANTS

CROSS-REFERENCE TO RELATED APPLICATION

This application is a continuation-in-part of application Ser. No. 215,151 filed Dec. 11, 1980, now abandoned.

FIELD OF THE INVENTION

Our present invention relates to a method of recovering boric acid from waste-water concentrates containing the boric acid together with radioactive substances (radionuclides) and chemical residues, especially concentrates derived from nuclear power plants, i.e. plants producing electrical energy utilizing nuclear reactors and having a cooling system, generally a primary cooling system to which boric acid is added. The invention also deals with improvements in operating nuclear power plants of this type.

BACKGROUND OF THE INVENTION

Nuclear power plants of the type in which a nuclear reactor generates heat which is ultimately converted into electrical energy, generally operate with a plurality of coolant-circulating systems, e.g. a primary coolant system and a secondary coolant system, which ultimately transfer the heat to a fluid such as steam, which, in turn, can be used to drive turbines for the generation of electrical energy.

In many cases, the primary coolant system is operated with water to which boric acid is added, the primary coolant system circulating the cooling directly through the core of the nuclear reactor.

From such nuclear power plants a waste-water concentrate is obtained which may contain, apart from the boric acid, various radionuclides and chemical residues.

Such waste water may be recovered from evaporator units utilized in the processing of the waste-water, from leakage from the primary system in which the coolant contains boric acid or as sump waters. The concentrate usually contains boric acid up the solubility limit and can contain, as radionuclides, Cr-50, Mn-54, Co-58, Co-60, Sb-124, Cs-134 and Cs-137. The concentrate also can contain corrosion products, suspended matter, surface active agents and complex-forming chemicals as the chemical residues.

The boric acid concentration in the practically neutral waste-water concentrate can be about 40 g/l or above.

In most cases, such waste-water concentrates are generally packaged or stored as is the case with other radioactive wastes in an extremely costly operation.

To reduce the amount of radioactive waste which must be stored, a method has been proposed (see German open application - Offenlegungsschrift - DE-OS No. 27 23 025) whereby boric acid is recovered and can be recycled to the primary coolant system of the reactor.

In this process, the waste-water concentrate is initially subjected to concentration by boiling and the boric acid in the concentrate is transformed, with methanol, into the boric acid trimethylester. The latter is distilled off and converted again to boric acid and methanol by hydrolysis.

The boric acid has a sufficiently high purity that it can be directly utilized in the primary system.

This process involves various problems because of the use of methanol which is highly volatile and combustible.

As a result, the process involves hazards to operating personnel and may not satisfy environmental protection standards. Difficulties are encountered in the use of organic solvents which result in iodine residues in the filters.

OBJECTS OF THE INVENTION

It is the principal object of the present invention to provide a process for the recovery of boric acid from a waste-water concentrate whereby disadvantages of prior art systems can be obviated and at comparatively low cost the problem of storage of the radioactive wastes can be eased, and a boric acid of acceptable purity obtained for reuse in the cooling system of a nuclear reactor.

Another object of this invention is to provide a method of operating a nuclear reactor whereby the disadvantages of the above-mentioned systems can be overcome and the operating efficiency improved.

SUMMARY OF THE INVENTION

These objects and others which will become apparent hereinafter are attained, in accordance with the present invention, by a process in which the boric acid containing waste-water concentrate, which also includes radionuclides and chemical residues, is subjected to an acidification, e.g. to a pH of 2 or lower by the addition of sulfuric acid, hydrochloric acid, nitric acid and/or acetic acid or a combination of these acids.

The boric acid precipitates from the resulting mixture, is removed from the aqueous phase, and is subjected to at least one recrystallization step.

We have found that the solubility of boric acid decreases in systems with increasing acidification quite sharply. The boric acid which has precipitated can be recovered as the filter cake on the filter serving for the separation and contains only about one-fifth of the original radioactivity and other chemical residues present in the concentrate originally.

When this boric acid is then recrystallized, the product, in terms of the original activity of the radionuclides, is found 99.9% free of them. The recrystallized boric acid is practically pure and thus has been substantially completely decontaminated so that it can be used again in the primary system of the nuclear power plant, up to 99.9% of the radionuclide activity having been eliminated therefrom and remaining for further treatment with the balance of the concentrate, e.g. storage in the manner conventional with nuclear wastes.

The system of the present invention has the significant advantage that it allows the recovery of boric acid using exclusively an aqueous medium so that the process is not detrimental to the health and safety of operating personnel. The volume of radioactive wastes is significantly reduced and the process can be carried out with relatively simple equipment which in most cases is present at the nuclear power plant.

According to a feature of the invention, the temperature of the waste-water concentrates during acidification or thereafter is reduced, preferably to about 10° C. This has been found to increase the yield of the boric acid.

It has also been found to be advantageous for the same purpose to decrease the solubility of the boric acid in the waste-water concentrate, e.g. by the addition of salts utilizing the salting-out effect. A particularly suitable salt has been found to be lithium chloride which is added immediately before or during acidification.

In the preferred and best mode embodiment of the invention, the waste-water concentrate is acidified at a temperature not to exceed room temperature to a pH of a maximum of about 2 to recover, as the filter cake, about 70% of the boric acid present in the concentrate. The recrystallization can be carried out very simply, by dissolving the boric acid of the filter cake in hot water to the limit of its solubility and thereafter cooling this solution to precipitate boric acid with a chemical yield (based upon the amount of boric acid originally present) between 60 and 90%.

The single recrystallization generally yields a boric acid which is sufficiently decontaminated for reuse although if higher degree of freedom from radionuclide activity is desired, second and third recrystallizations can be carried out.

It has also been found to be advantageous, prior to acidification, to filter out solids from a waster-water concentrate. The filtration prior to acidification as well as filtration subsequent to acidification can be effected on filters, e.g. sintered glass filters, which are not affected by the acidified solution and which can have a pore size of substantially 10 to 25 microns.

According to another feature of the invention, the boric acid can be treated with an ion exchanger.

For further cleaning of the recrystallized boric acid and even as an alternative to one or more of the subsequent recrystallization steps, the boric acid can be subjected to steam distillation or transformation into organic or nonorganic volatile compounds, e.g. to borontrifluoride which can, in turn, be hydrolyzed and decomposed back to boric acid by treatment with water. The conversion to borontrifluoride can be effected with the system containing sodium fluoride and calcium fluoride and sulfuric acid.

BRIEF DESCRIPTION OF THE DRAWING

The above and other objects, features and advantages of the present invention will become more readily apparent from the following description, reference being made to the accompanying drawing in which the sole FIGURE is a flow diagram illustrating the method of this invention.

SPECIFIC DESCRIPTION

In a first step 10 a waste-water concentrate 11 containing boric acid, radionuclides and chemical wastes is derived from a nuclear power plant utilizing the boric acid as an additive to the primary coolant, fresh boric acid (to replace losses in the system) being supplied as shown at 12.

The waste-water concentrate is then filtered at 13 to free it from suspended solids, whereupon the concentrate 14 is subjected to acidification at 15. The resulting suspension 16 of precipitated boric acid and waste water is filtered at 17 and the waste water can be treated in the same manner as other nuclear wastes. The boric acid is then recrystallized at 18 and the recrystallized boric acid product is recycled at 19 to the primary coolant of the nuclear reactor. The solid residue from the filtration step may also be processed by the nuclear waste treatment 20 or returned for mixture with fresh waste water which is concentrated at 21.

EXAMPLE

A waste-water concentrate from a nuclear power plant contains a high level of suspended solids, 42 g/l boric acid and the following radionuclides $6 \times 10^{-3}$ $Ci/m^3$ Cr-51, $4 \times 10^{-3}$ $Ci/m^3$ Mn-54, $9 \times 10^{-3}$ $Ci/m^3$ Co-58, $1.9 \times 10^{-1}$ $Ci/m^3$ Co-60, $1.2 \times 10^{-2}$ $Ci/m^3$ Sb-124, $9.4 \times 10^{-3}$ $Ci/m^3$ Cs-134 and $2.9 \times 10^{-2}$ $Ci/m^3$ Cs-137. The pH of the waste-water concentrate was 7.5.

The unfiltered concentrate was treated at a temperature of 20° C. with sulfuric acid in a quantity sufficient to give a pH of 2 and boric acid precipitated out. The suspension was then filtered through a filter with a pore size of 10 microns and the filter cake was obtained in a chemical yield of 70.9%. The total activity was about 20% of the original radioactivity.

The boric acid was then dissolved in water at 95° C. and recrystallized by cooling the solution. The chemical boric acid yield was 70.9% and the radionuclide content was below the level legally permitted for discharge into surface streams. When the boric acid was recrystallized a second time in a similar manner, there was no material reduction in the radionuclide level.

We claim:

1. A method of recovering boric acid from a nuclear power plant waste-water concentrate containing boric acid, radionuclides and chemical residues, comprising the steps of:

removing solids from said nuclear power plant waste-water concentrate by filtration;

acidifying the concentrate to a pH of about 2 with at least one acid selected from the group which consists of sulfuric acid, hydrochloric acid, nitric acid and acetic acid, adding a boric-acid-solubility reducing salt thereto, and lowering the temperature as the resulting solution to precipitate boric acid;

recovering the precipitated boric acid by filtering upon a filter of a pore size of 10 to 25 microns;

taking the precipitated boric acid into solution in hot water; and cooling the solution to recrystallize the boric acid out of the latter solution.

2. The method defined in claim 1 wherein the waste-water concentrate is cooled to a temperature of about 10° C.

3. The method defined in claim 1 wherein the salt is lithium chloride.

* * * * *